United States Patent [19]
Barton et al.

[11] Patent Number: 4,736,981
[45] Date of Patent: Apr. 12, 1988

[54] APPLIQUE STRUCTURE FOR THE EXTERNAL B PILLAR AREAS OF A FOUR DOOR VEHICLE

[75] Inventors: Billy J. Barton, Royal Oak; Virginia J. Fischbach, Troy; Scott J. Priest, Royal Oak; Ronald C. Johnson, Rochester, all of Mich.

[73] Assignee: Chrysler Motors Corporation, Highland Park, Mich.

[21] Appl. No.: 59,896

[22] Filed: Jun. 9, 1987

[51] Int. Cl.⁴ ................................................ B60J 1/10
[52] U.S. Cl. .................................... 296/201; 296/202; 49/490; 49/493
[58] Field of Search ............. 296/202, 201, 31 P, 296/39 R, 191; D12/190, 196; 49/490, 493; 52/732

[56] References Cited

U.S. PATENT DOCUMENTS

| 3,869,332 | 3/1975 | Loew | D12/196 |
| 4,229,036 | 10/1980 | Toda | 296/39 R |
| 4,607,879 | 8/1986 | Mori et al. | 296/202 |

FOREIGN PATENT DOCUMENTS 979053  12/1975  Canada ................. 296/191

Primary Examiner—Robert B. Reeves
Assistant Examiner—Carol L. Olson
Attorney, Agent, or Firm—Edward A. Craig

[57] ABSTRACT

An appliqué structure for the external B pillar areas of a four door vehicle is provided. The vehicle structure is one wherein the pair of doors on each side are hingedly mounted at the forward edges and wherein the B pillar areas are defined by the upper door edges. The appliqués are adhered to the B pillar area and form a double seal at the juncture therebetween. Additional seals are provided around the periphery of the appliqués.

5 Claims, 2 Drawing Sheets

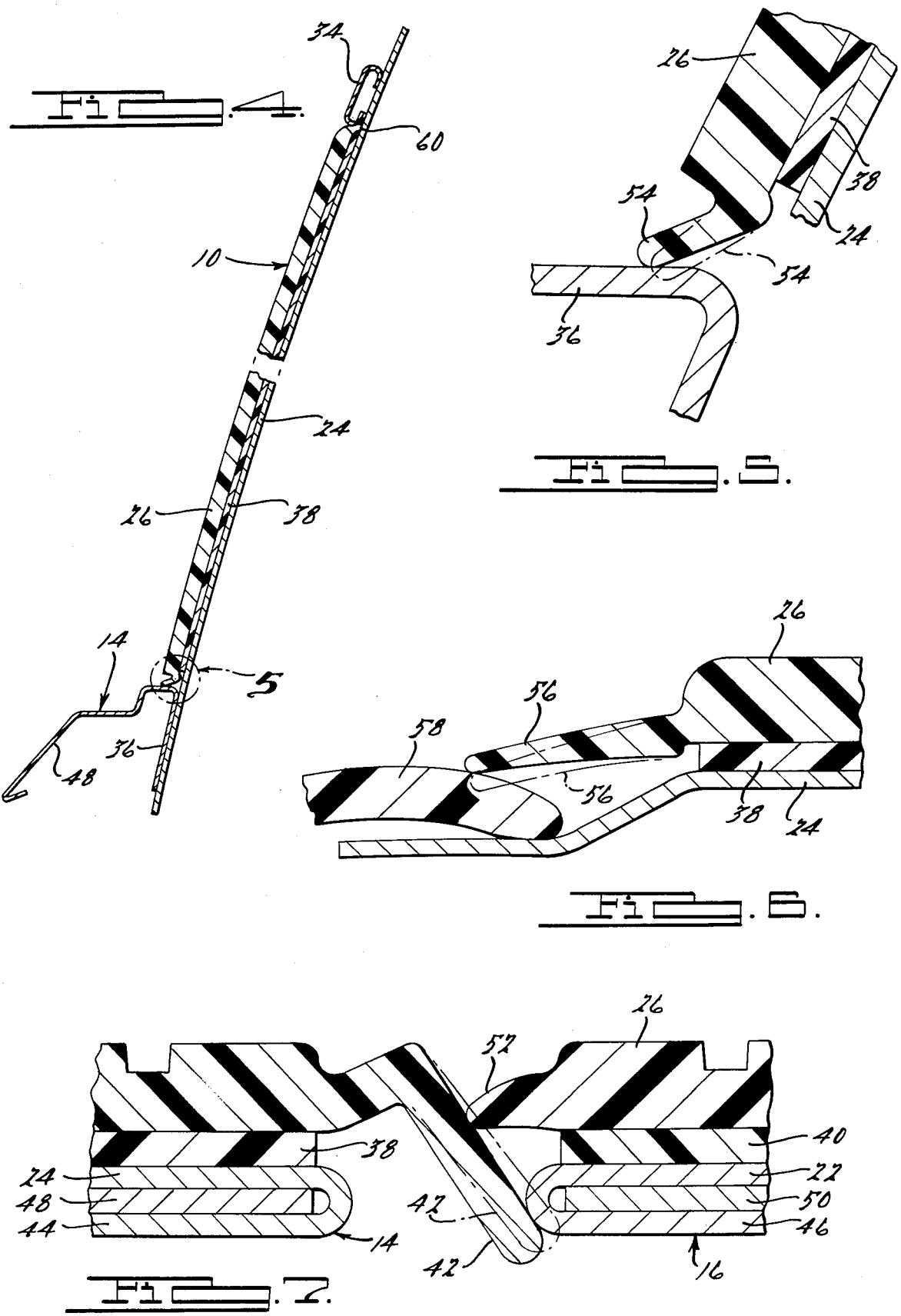

APPLIQUE STRUCTURE FOR THE EXTERNAL B PILLAR AREAS OF A FOUR DOOR VEHICLE

BACKGROUND OF THE INVENTION

1. Field of Invention:

An appliqué structure for a four door vehicle which is adhered to the B pillar areas. These areas are externally defined by the door structure adjacent to the juncture of the front doors and the rear doors. The appliqué structure includes a double seal at the juncture.

2. Prior Art:

It is a conventional practice to provide appliqués on the B pillars of vehicles. Appliqués are decorative pieces fastened to a larger surface of a vehicle. A pillar is a structural member provided to support the structure of a vehicle. The forward pillar is conventionally designated as the A pillar, the center pillar as the B pillar and the rear pillar as the C pillar. Side windows are provided between the pillars.

Various materials have been used to fabricate appliqués for the B pillar area. Both plastic and metallic appliqués have been used in the past. The usual way to attach a pillar has been to provide a weld stud on the pillar. The appliqué has had a clip provided on the under side thereof which has been attachable to the weld stud.

A disadvantage of such a construction is that it has been relatively expensive to fabricate and mount and the appliqué has been relatively thick, for example, 0.360 inch. Such a thickness results in undesirable air resistance when the vehicle is moving and an undesirable appearance.

The problem has been exacerbated in four door vehicles where the B pillar structure is hidden behind the forward edge of the rear door and the rearward edge of the front door. It is such an arrangement that the present invention is concerned with. In this arrangement, it is necessary to provide the appliqué structure in two pieces. One piece is received on the forward edge of the rear door and the other piece is received on the rearward edge of the front door. In such a construction, a small crack exists at the juncture of the two parts of the appliqué. Such a crack is desirably sealed against the weather, particularly from air movement while the vehicle is in motion. Small amounts of air which enter a moving vehicle through a crack or crevice result in an air noise which is undesirable with respect to passenger comfort. Vehicle passengers are bothered by the decibel level within the passenger compartment. The phenomena is broadly referred to as NVH, this designation being an acronym for noise, vibration and harshness. The present invention substantially eliminates any NVH problem which could be caused at the juncture of the two parts of the appliqué structure by the provision of a double seal at this juncture.

The present invention also offers advantages with respect to the prior art clip and stud arrangement above-referred to in that the appliqué is adhered to the vehicle, thus eliminating the thickness of the clip and stud arrangement. The thinner appliqué results in a more aerodynamic function and appearance. Further the appliqué structure is less expensive to make and install.

SUMMARY OF THE INVENTION

An appliqué structure for the external B pillar areas of a four door vehicle is provided. The vehicle is of the type wherein the pair of doors on each side are hingedly mounted at the forward edges thereof and wherein the forward portions of the B pillar areas are externally defined by the upper rearward edges of the front doors and rearward portions of the B pillar areas are externally defined by the upper forward edges of the rear doors.

The appliqué structure for each pair of doors comprises first and second elongated appliqué fabricated of a flexible resinous material. Each pair of doors on each side of the vehicle has a first appliqué adhered to the upper forward edge of the rear door and a second appliqué adhered to the upper rearward edge of the front door. The first appliqué has a first sealing lip on the forward edge extending for the length thereof. The first lip is angled inwardly with respect to the vehicle interior and extends past the upper rear edge of the front door on the inner side thereof in pressure engagement with the upper rear edge when the doors are closed. The second appliqué has a second sealing lip on the rear edge extending for the length thereof. The second lip is in pressure engagement with the outer surface of the first lip when the doors are closed whereby the appliqués form a double seal when the doors are closed. The first sealing lip is relatively wide and the second sealing lip is relatively narrow.

Sealing lip structure is preferably provided around the remaining periphery of the appliqués in pressure contact with door surfaces. Desirably, the appliqués do not exceed about 0.220 inch in thickness and have a durometer of from about 30 to 70 Shore A.

BRIEF DESCRIPTION OF THE DRAWINGS

In the drawings:

FIG. 4 is a sectional view taken substantially along the line 4—4 of FIG. 2 looking in the direction of the arrows;

FIG. 5 is a view on an enlarged scale of structure within the circle identified by the arrow 5 in FIG. 4;

FIG. 6 is a view on an enlarged scale of the structure within the circle identified by the arrow 6 in FIG. 3; and FIG. 7 is a view on an enlarged scale of the structure within the circle identified by the arrow 7 in FIG. 3.

DETAILED DESCRIPTION OF A PREFERRED EMBODIMENT

Figure 1:
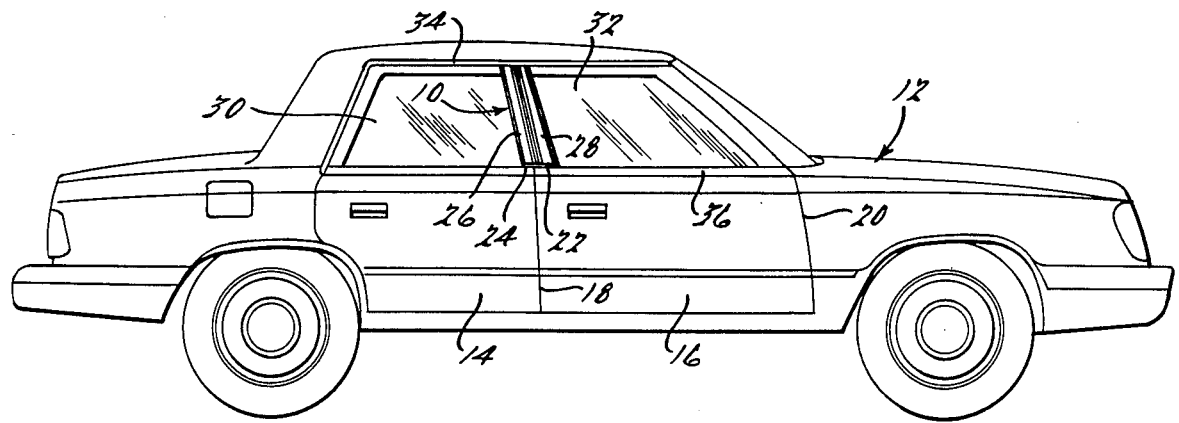
FIG. 1 is a side elevational view of a four door vehicle with the appliqué structure of the present invention in place forming one embodiment of the present invention.

Referring to FIG. 1, it will be noted that the appliqué structure 10 of the present invention has been illustratively applied to the B pillar area of the right hand side of a vehicle which is a four-door automobile 12. A pair of doors comprising a rear door 14 and a front door 16 are provided on the right hand side of the vehicle shown. Similar doors and appliqué structure are provided on the left side of the vehicle. Both doors 14, 16 are hingedly mounted at the forward edges 18, 20 as is conventional. The forward portions of the B pillar areas are externally defined by the upper rearward marginal edge portions 22 of the front doors 16 and the rearward portions of the B pillar areas are externally defined by the upper forward marginal edge portions 24 of the rear doors 14.

Figure 2:
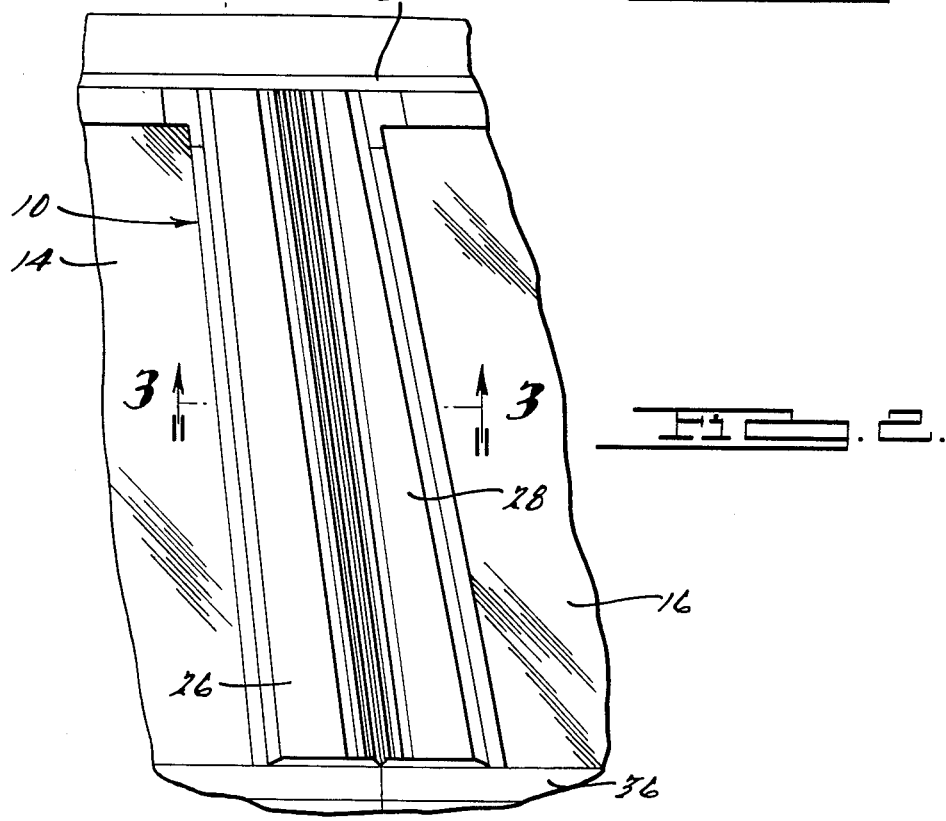
FIG. 2 is a view of the B pillar area of the vehicle of FIG. 1 on an enlarged scale.
Figure 3:
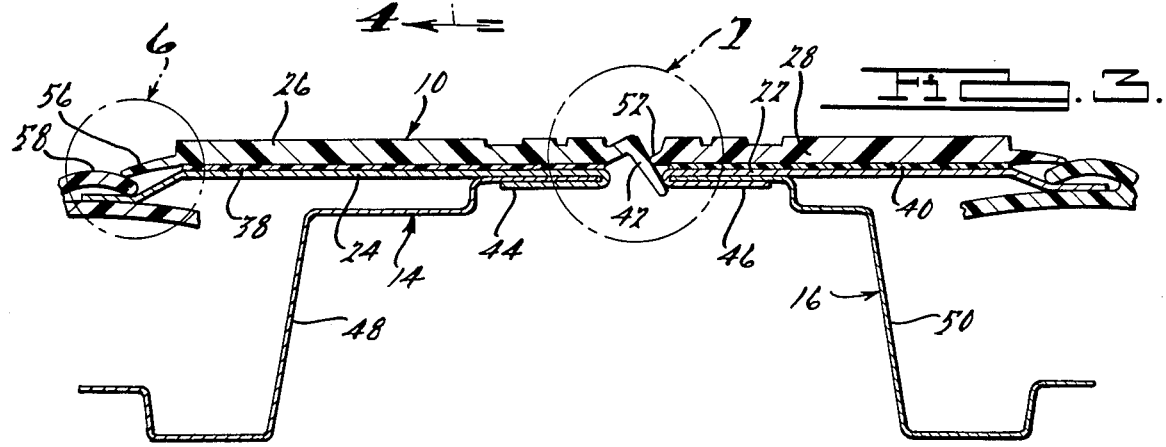
FIG. 3 is a sectional view taken substantially along the line 3—3 of FIG. 2 looking in the direction of the arrows.

Referring to FIGS. 2, 3 and 4, it will be noted that the appliqué structure 10 for each pair of doors comprises first and second elongated appliqués 26, 28 which are fabricated of a flexible, resinous material. In order to obtain the desired flexibility, the material of the appliqué should have a durometer of from about 30 to 70 Shore A. Examples of suitable material are urethanes and polyesters. One suitable polyester blend is marketed by E. I. du Pont de Neumours under the trademark "HYTREL". As will be noted, the appliqués are elongated so that they extend between the top and bottom of the vehicle windows 30, 32. The upper ends of the appliqués terminate at a molding 34 which is referred to as the upper daylight opening molding. The lower end of the appliqué terminates at a molding 36 which is referred to as the belt molding. The actual structure of the B pillar is positioned behind the appliqués and is not shown. Preferably, the appliqués to not exceed about 0.220 inch in thickness.

As is shown in the figures, the appliqués are provided with an adhesive strip 38, 40 on the underside thereof. The adhesive strips have adhesive on both sides. One side of each adhesive strip is adhered to the underside of an appliqué. The other side of each adhesive strips is secured to material forming the doors, namely, the marginal edge portions 22, 24. The tape strips 38, 40 may be formed of a suitable material such as an acrylic or neoprene coated with an adhesive on both sides.

The appliqué 26 on the rear door 14 is provided with a sealing lip 42 on the forward edge thereof which extends for the length of the appliqué. The lip 42, as shown in FIGS. 3 and 6, is angled inwardly with respect to the vehicle interior and extends past the upper rear edge of the front door on the inner side thereof in pressure engagement with the upper rear edge when the door is closed as shown. As will be noted, the marginal edges of both doors are bent back at 44, 46 to form what is termed a hem. The marginal edge portions 22, 24 form part of what is referred to as outer door sheet metal. The remainder of the door structure is formed by elements 48, 50 which are referred to as inner door sheet metal. The marginal edges of the elements 48, 50 are retained in place by means of the bent over portions 44, 46.

The other applique 28 has a sealing lip 52 on the rearward edge which extends for the length thereof. The lip 52 is in pressure engagement with the outer surface of the lip 42 when the doors are closed whereby the appliqués form a double seal with the doors closed.

The lip 42 is relatively wide while the other lip 52 is relatively narrow. This permits the lip 42 to make pressure contact with both the marginal edge of the door 16 and the lip 52 while the lip 52, being relatively narrow, can form a tight pressure engagement with the lip 42.

Sealing lip structure is also provided around the remaining periphery of the appliqués in pressure contact with exterior door surfaces as will be noted in FIGS. 3, 4, 5, 6 and 7. A sealing lip 54 is provided across the width of the lower ends of the appliqués and is in pressure engagement with the belt molding 36 as shown in FIG. 5. The lip 54 is shown in dotted lines to illustrate its position prior to engagement with the molding 36 to illustrate the pressure contact which is made. A similar showing is made in FIGS. 6 and 7. As shown in FIGS. 3 and 6, a sealing lip 56 is provided along the length of the other edge of the appliqués. This lip 56 is in sealing engagement with a member 58 formed of resinous material which is provided around the window frame to receive the edges of the window glass. The member 58 is held in place by means of the material forming the outer door sheet metal which extends around the window openings. A small sealing lip 60 is provided along the upper edges of the appliqués as may be noted in FIG. 4. This lip 60 slides beneath the molding 34 to form a seal therewith.

I claim:

1. An appliqué structure for the external B pillar area of a four door vehicle wherein the pair of doors on each side are hingedly mounted at the forward edges thereof and wherein the forward portions of the B pillar area are externally defined by the upper rearward marginal edge portions of the front doors and the rearward portions of the B pillar area are externally defined by the upper forward marginal edge portions of the rear doors, the appliqué structure for each pair of doors comprising first and second elongated appliqués fabricated of a flexible resinous material, each pair of doors on each side of the vehicle having a first appliqué adhered to said upper forward edge of the rear door, a second appliqué adhered to said upper rearward edge of the front door, the first appliqué having a first sealing lip on the forward edge extending for the length thereof, said first lip being angled inwardly with respect to the vehicle interior and extending past the upper rear edge of the front door on the inner side thereof in pressure engagement with said upper rear edge when the doors are closed, the second appliqué having a second sealing lip on the rearward edge extending for the length thereof, the second lip being in pressure engagement with the outer surface of the first lip when the doors are closed whereby the appliqués form a double seal with each other with the doors closed.

2. An appliqué structure as defined in claim 1, further characterized in that each appliqué includes additional sealing lip structure around the remaining edges thereof in pressure contact with exterior door surfaces.

3. An appliqué structure as defined in claim 1, further characterized in that neither appliqué exceeds about 0.220 inch in thickness.

4. An appliqué structure as defined in claim 1, further characterized in that each appliqué has a durometer reading of from about thirty to seventy Shore A.

5. An appliqué structure as defined in claim 1, further characterized in that the first sealing lip is relatively wide and the second sealing lip is relatively narrow.

* * * * *